United States Patent [19]

Mondshine

[11] 4,033,893
[45] July 5, 1977

[54] POTASSIUM-LIME AQUEOUS DRILLING FLUIDS AND METHOD OF PREPARING SAME

[75] Inventor: Thomas C. Mondshine, Houston, Tex.

[73] Assignee: NL Industries, Inc., New York, N.Y.

[22] Filed: Nov. 20, 1975

[21] Appl. No.: 633,867

[52] U.S. Cl. .................. 252/8.5 A; 252/8.5 B
[51] Int. Cl.² ............................ C09K 7/00
[58] Field of Search .......... 252/8.5 A, 8.5 B, 8.5 C, 252/8.5 P; 175/65

[56] References Cited

UNITED STATES PATENTS

| 2,802,783 | 8/1957 | Weiss et al. | 252/8.5 R |
|---|---|---|---|
| 2,868,726 | 1/1959 | Brukner et al. | 252/8.5 B |
| 2,896,915 | 7/1959 | Weiss et al. | 252/8.5 B |
| 2,960,464 | 11/1960 | Weiss et al. | 252/8.5 B |
| 3,079,334 | 2/1963 | Clem | 252/8.5 A |
| 3,079,335 | 2/1963 | Clem | 252/8.5 A |
| 3,084,121 | 4/1963 | Wiener | 252/8.5 A |
| 3,177,142 | 4/1965 | Brukner et al. | 252/8.5 B |

OTHER PUBLICATIONS

Mondshine – "Oil & Gas Journal," Apr. 22, 1974, pp. 120–130.

Primary Examiner—Brooks H. Hunt

[57] ABSTRACT

The invention provides water base drilling fluids containing lime and potassium compounds which have the following advantages as compared to prior art lime muds and potassium muds: (a) provide better borehole stability than lime muds; (b) easier to control than lime muds and potassium muds; (c) drilled solids have much less effect on the rheological properties of these drilling fluids as compared to lime muds and potassium muds; (d) the thermal gelation of these drilling fluids after contamination with shale is much less severe than that of shale contaminated lime muds or potassium muds; and (e) bit balling and cuttings agglomeration when drilling mud making shales is much less than when using lime muds or potassium muds. These drilling fluids comprise a suspension of clay, lime and 10–30 ppb of a lignitic material in an aqueous phase, the drilling fluid having a Pm in the range from 1 to 40 and a pH in the range from 12.4 to 13.5, the aqueous phase being saturated with lime having a Pf in the range from 1 to 8 and a $K^+$ concentration of at least 8000 ppm, wherein Pm > Pf. The invention also provides a method of preparing muds containing lime and potassium whereby the increase in viscosity and gel strength which normally accompanies the addition of lime to aqueous clay-containing muds is minimized which consists of adding to a suspension of clay and a lignitic material: KOH, KCl, and lime, in that order.

16 Claims, No Drawings

POTASSIUM-LIME AQUEOUS DRILLING FLUIDS AND METHOD OF PREPARING SAME

BACKGROUND OF THE INVENTION

The invention relates to drilling fluids and completion fluids for use in wellbores traversing subterranean formations, particularly water base fluids.

PRIOR ART

An excellent treatise which sets forth the prior art in the field of drilling fluids up to 1963, the year in which the third edition was published, is the book entitled "Composition and Properties of Oil Well Drilling Fluids" by Walter F. Rogers (Gulf Publishing Co., Houston, Texas).

Many drilling fluids or muds have been developed through the years in order to counteract various conditions which exist during the drilling of wellbores. High pH, lime-base drilling fluids which contain lime, conventional hydratable bentonitic type of drilling clay, conventional thinners such as quebracho and various lignosulfonate derivatives, caustic soda, water, and weight material as desired have been used extensively. See, for example, the following articles: "Lime-Base Muds", J. L. Battle and P. E. Chaney. World Oil, April, 1950, pp. 101-108; "Chemistry and Control of Lime Base Muds", The Petroleum Engineer, November, 1949, pp. B-54-B-58. Such lime-base muds operate in a soluble calcium range of 80-200 ppm $Ca^{++}$ utilizing excess lime and caustic soda. If the lime content and the calcium in solution decrease during drilling operations, hydration of the clays in the mud occurs resulting in an increased viscosity and gel strength of the mud, to be corrected by the addition of lime. If the hydroxyl content drops, the calcium content increases resulting in an increase in viscosity and gels, to be corrected by caustic soda additions. Thus an excess of undissolved lime is normally carried in lime-base muds, and caustic soda additions serve to limit the lime solubility and calcium adsorption to values which give a minimum in viscosity and thixotropy.

Since the soluble $Ca^{++}$ content of such muds is relatively low, the inhibition of shale hydration is not all that it would be if the concentration were higher. Thus Weiss et al U.S. Pat. No. 2,802,783 teaches a drilling fluid composition comprising an alkaline aqueous phase saturated with lime containing a water soluble calcium salt dissolved therein to yield a calcium ion concentration greater than 200 ppm. Other polyvalent cations function similarly to $Ca^{++}$ in their affects on clays. In U.S. Pat. No. 2,856,355 Weiss et al. disclose a drilling fluid composition comprising an alkaline aqueous phase saturated with lime containing a water soluble barium salt dissolved therein to give a barium ion concentration of at least 300 ppm. In U.S. Pat. No. 2,856,357 Weiss et al. disclose a similar drilling fluid containing at least 200 ppm $Sr^{++}$ in place of the $Ba^{++}$. Weiss et al. U.S. Pat. No. 2,960,464 discloses a method of increasing the $Ca^{++}$ concentration in a mud by reacting the lime in the mud with an ammonium compound.

Drilling fluids containing $K^+$, usually added in the form of potassium chloride, have long been known. Recently T. C. Mondshine disclosed a new drilling fluid containing pre-hydrated bentonite, a potassium lignite derivative, potassium chloride, potassium hydroxide, and a special surfactant for controlling the viscosity and gels of the mud. See: "Tests Show Potassium-Mud Versatility", T. C. Mondshine, Oil and Gas Journal, April 22, 1974, pp. 120-130. As disclosed therein, contaminants such as cement, salt, or gypsum are detrimental to potassium muds. Remedies include treatment with potassium bicarbonate and potassium carbonate to form insoluble calcium carbonate, and pH adjustments using potassium hydroxide. The desirable filtrate alkalinity, $P_f$, is maintained between 0.1 and 0.5, and the pH between 9 and 10. It has been found by experience that in such muds containing excessive quantities of chemically dispersed solids, the surfactant has poor thinning efficiency and will not prevent thermal gelation of the mud (increasing viscosity and gels upon heating). Conventional thinners have not been satisfactory for controlling the rheology of potassium base mud and containing the desired potassium chloride concentrations. Limited treatments of organic thinners such as ferrochrome lignosulfonate will reduce gel strength in such muds, but high concentrations promote dispersion of the drilled cuttings and have a harmful effect on shale stability.

SUMMARY OF THE INVENTION

I have found that certain novel water base drilling fluids containing lime and potassium compounds possess the following advantageous characteristics as compared to prior art lime muds and potassium muds:

i. provide better borehole stability than lime muds;

ii. easier to control than lime muds and potassium muds since the lime content, alkalinity, and $K^+$ concentration can vary over wide ranges without appreciably effecting the rheological and filtration characteristics of these drilling fluids;

iii. drilled solids have much less effect on the rheological characteristics of these drilling fluids as compared to lime muds and potassium muds;

iv. the thermal gelation of these drilling fluids after contamination with shale is much less severe than that of shale contaminated lime muds or potassium muds; and v. bit balling and cuttings agglomeration when drilling mud making shales is much less than when using lime muds or potassium muds.

These water base drilling fluids comprise a suspension of clay, lime, and 10-30 ppb of a lignitic material in an aqueous phase having a Pm in the range from 1 to 40 and a pH in the range from 12.4 to 13.5, wherein the aqueous phase is saturated with lime and has a Pf in the range from 1 to 8 and a $K^+$ concentration of at least 8000 ppm, and wherein Pm > Pf.

I have also found a method of preparing such novel water base drilling fluids containing lime and potassium whereby the increase in viscosity and gel strength which normally accompanies the addition of lime to aqueous clay-containing mud is minimized. This method consists in adding to an aqueous suspension of clay and a lignitic material potassium hydroxide, potassium chloride, and lime, in that order, wherein the amount of KOH, KCl and lime are sufficient to impart to the drilling fluid the desired Pm, Pf, pH, $K^+$ concentration, and lime concentration.

PREFERRED EMBODIMENTS OF THE INVENTION

As indicated, this invention pertains to aqueous base drilling fluids containing a suspension of clay and a lignitic material in an aqueous phase. The clay present in the drilling fluid may be clay already present in a previously used drilling mud which is being converted into the inventive potassium-lime muds. Such clays may be conventional bentonitic clays or may be clays incorporated into the drilling fluid during its use in a drilling operation. Preferably the clays are conventional hydratable bentonitic drilling clays such as Wyoming bentonite. Once the drilling fluids of this invention have been prepared, only pre-hydrated bentonitic clays should be intentionally added to achieve the properties desired. The preferred method of prehydrating the bentonite is given in Pippen U.S. Pat. No. 3,691,070, incorporated herein by reference. The amount of clay present in the drilling fluid must be sufficient to provide the fluid with good rheological and fluid loss properties, generally from 5 to 40 ppb. bentonite or its equivalent. The concentration of bentonite in a drilling fluid can be estimated using the Cation Exchange Capacity established procedure recommended by the American Petroleum Institute, API RP 13B, Fourth Edition, November, 1972.

The lignitic material required in the drilling fluid may be any lignite or brown coal containing appreciable quantities of humic acids. Preferred is the coal known as leonardite. Any coal which meets the specifications for the class designated Class IV, Lignitic, ASTM Designation D388-38, Classification of Coals by Rank can satisfactorily be employed as the lignitic material. The richest common source of humic acid is leonardite, which is an oxidized form of lignite. The lignitic material can be used as mined, can be dried, or the humic acids may be extracted from the lignitic material and used in the purified state. The humic acid is the active ingredient in the lignitic material. Alternatively, the lignitic material can be reacted with an alkali metal hydroxide to convert the humic acid to an alkali metal humate. Preferably the alkali metal is potassium since the drilling fluids of the present invention contain large quantities of potassium compounds. The potassium salt of chromated lignites such as those disclosed in Chisholm U.S. Pat. No. 3,009,874, incorporated herein by reference, are especially useful.

The drilling fluid must contain at least 10 ppb. of lignitic material, preferably from 10 ppb. to 35 ppb. With this concentration range the lignitic material functions as a shale hydration inhibitor, as a fluid loss control additive, and as a thinner to reduce the viscosity and gels of the drilling fluid. The drilling fluid may additionally condition minor amounts, up to about 10 ppb., of conventional drilling fluid dispersants such as quebracho and various lignosulfonate derivatives such as ferrochrome lignosulfonate and calcium lignosulfonate. An excessive concentration of such thinners, however, results in a decrease in the shale inhibiting characteristics of the drilling fluid and is to be avoided.

The drilling fluids of this invention have a Pm in the range from 1 to 40 and a pH in the range from 12.4 to 13.5. The aqueous phase of the drilling fluid, which may be separated from the drilling fluid by filtration, is saturated with lime and has a Pf in the range from 1 to 8 and a potassium ion concentration of at least 8000 ppm. Preferably the Pm value is in the range from 2 to 30, the Pf value is in the range from 2 to 8, and the $K^+$ is at least 10000 ppm. Pm is defined as the number of cc. of $N/50$ $H_2SO_4$ required to titrate 1 cc. of the whole mud to a phenolphthalein end point. Pf is defined as the number of cc. of $N/50$ $H_2SO_4$ required to titrate 1 cc. of the aqueous phase (filtrate) of a drilling fluid to a phenolphthalein end point and is a measure of the soluble hydroxyl content. In this drilling fluid the Pm value will exceed the Pf value which indicates that the concentration of lime in the drilling fluid is in excess of the amount required to saturate the aqueous phase. The excess or undissolved lime content can be estimated according to the following formula: excess lime = $(Pm - Pf) \div 4$.

The drilling fluids may also contain additives as needed for improving various characteristics of the drilling fluids. Thus the usual water loss (filtrate reducing) additives such as prehydrolyzed or pregelatinized starch, resins, and the like; the usual weighting agents such as barite, galena, siderite and iron oxide; the usual polymeric suspending agents such as xanthan gums, hydroxyethyl cellulose, and the like; and temperature stability additives such as alkali metal chromates, surface active agents, and the like may be present in the drilling fluids of the invention.

As indicated, the Pf value of the aqueous phase of the drilling fluid is indicative of the soluble hydroxyl content in the drilling fluid whereas the Pm value is indicative of the total hydroxyl content in the drilling fluid. The desired Pf and Pm values can be obtained by adjusting the concentration of alkali metal hydroxides and lime in the drilling fluid. Since the muds must contain a minimum of at least 8000 ppm $K^+$, it is preferred that the desired Pf and Pm values be obtained with potassium hydroxide and lime. KOH will effect both the Pf and Pm values since it is completely soluble in the drilling fluid whereas lime will effect only the Pm value since the aqueous phase of the drilling fluid is saturated with lime.

The drilling fluids must contain at least 8000 ppm $K^+$. The source of this potassium ion will be the KOH used to adjust the alkalinity of the mud and of the mud filtrate, the lignitic material if a lignitic material containing potassium humate is used as a component of the drilling fluid, and potassium chloride. Other potassium salts such as potassium nitrate and potassium sulfate could be used; however, these salts are much more expensive than KCl and generally will not be used.

Another aspect of this invention is a method of producing aqueous drilling fluids containing KCl, clay, and lime. This method consists of hydrating the desired concentration of clay, preferably from 5 to 15 ppb, in fresh water, adding the desired concentration of clay dispersant, adding KOH to raise the pH to at least 9.5, preferably at least 10.5, adding the desired concentration of KCl, and only thereafter adding the desired amount of lime. It has been found that this order of addition minimizes the viscosity increase which normally occurs on adding lime to aqueous clay containing drilling fluids.

This process may be advantageously used to prepare the drilling fluids of this invention. Thus the desired concentration of bentonite, preferably 5 to 12 pbb., is hydrated in fresh water and there is admixed therewith the desired concentration of lignitic material. The desired concentration of potassium hydroxide is added followed by the desired concentration of potassium chloride. Finally after thorough mixing the desired concentration of lime is added. Other desired solid materials such as weighting agents are then added.

The initial step in the conversion of a pre-existing clay containing water-base mud to the potassium-lime muds of this invention is to dilute the water-base mud with water such that it contains a concentration of reactive clay less than the equivalent of about 15 ppb bentonite. After dilution is complete the KOH is added together with lignitic material. The KOH increases the solubility of the lignitic material and decreases the solubility of the lime. Thus the maximum thinning efficiency of the lignitic material is obtained. The KCl and lime are thereafter added. The order of addition of the KCl and lime should be determined by pilot testing. If the concentration of solids in the mud is high, such as in weighted muds for example, then KCl and lime will both increase the viscosity of the mud excessively during its conversion to a potassium-lime mud. It is desired to minimize the maximum viscosity obtained. Fortunately, the final viscosity of the drilling fluid will be much lower than this maximum viscosity due to the combined effect of the KCl and lime. The viscosity of the water-base mud increases as the concentration of KCl added increases, whereas the viscosity of the mud first increases to a maximum and then decreases as the concentration of lime added increases. However, it has been found that lime functions as a viscosity reducing agent for muds containing KCl. Thus it may be possible to minimize the maximum viscosity obtained during the conversion of a waterbase mud to a potassium-lime mud by the incremental addition of the KCl followed by the incremental addition of the lime until the total desired concentrations of each are present in the drilling fluid. Pilot testing will determine the optimum amounts to be added at each step in the conversion. Generally, however, if such an incremental addition of KCl and lime is not undertaken, then the least viscosity increase will be obtained by the addition of the lime followed by the addition of the KCl if the concentration of KCl exceeds about 3% by weight of the aqueous phase of the drilling fluid.

The invention is further described by the following examples which are illustrative of specific modes of practicing the invention and the results achieved, and are not intended as limiting the scope of the invention, as defined by the appended claims, but are illustrative thereof.

The following properties of the drilling fluids in the examples were determined by the established procedures recommended by the American Petroleum Institute, API RP 13B, Fourth Edition, November, 1972: plastic viscosity; yield point; 10-second (initial) gel strength; 10-minute gel strength; pH; low temperature filtrate; filtrate alkalinities (Pf and Mf); mud alkalinity (Pm); calcium concentration; density; funnel viscosity; high temperature filtrate; % by volume of oil, water, dissolved solids and indissolved solids; methylene blue exchange capacity; shear strength; and chloride ion concentration. The $K^+$ concentration in the drilling fluids was determined using the following procedure:

Potassium Ion Selective Electrode

The equipment consists of a portable, battery-operated Corning Model No. 610A pH/millivolt meter, a standard reference calomel electrode and a potassium selective ion glass membrane electrode (Part No. 1002, Markson Science, Inc.).

In practise, the two electrodes are placed into standard solutions of KCl to calibrate the meter. The proportionate relationship between the electro chemical potential generated and various KCl solutions of known potassium ion content (ppm) is determined. The relationship can be expressed in graphical or tabular form for convenience in determining concentrations of potassium ions in unknown liquids. The salt solutions used cover a range of 500 ppm to 50,000 ppm potassium and embrace 140 millivolts on the meter scale.

The two electrodes are immersed in the drilling fluid to be tested. Millivolt readings are determined and compared with the readings obtained from the known solutions. Usually, drilling fluids contain sodium ions which interefere with the readings obtained for the potassium ion. This results in erroneous high readings. Consequently, the sodium ion content must be determined separately and an appropriate correction applied to the potassium ion concentration to give a true potassium value. For this purpose, the potassium ion electrode is replaced with a sodium ion selective glass membrane electrode (Part No. 1001, Markson Science Inc. Co.). The meter and electrodes are then calibrated as before but by using standard solutions of NaCl instead of KCl. The sodium ion contents of the mud or mud filtrate is then determined by comparison of millivolt readings with the calibration data. From previous tests with mixtures of solutions of KCl and NaCl, potassium ions were not found to interfere with measurements made with the sodium ion electrode. Consequently the following correction factor was used to obtain the actual potassium ion content:

$$K_{(actual, ppm)} = K_{(original, ppm)} - Na\ (ppm)/2$$

Other known methods which may be used are under investigation by the American Petroleum Institute and an established recommended procedure should soon be available. These include a standard addition method using an Orion specific ion meter, Model 404, and potassium specific ion electrode, Model 92-19; a standard addition method using an expanded scale pH meter, such as a Corning Model 10, and the Model 92-19 electrode; an indirect titration method using an excess of sodium tetraphenylborate to precipitate $K^+$ and quaternary ammonium salt to titrate the excess sodium tetraphenylborate (see pp. 22 and 23 of *Association of Official Analytical Chemists*, 11th Edition, 1970).

A test devised to indicate the borehole stabilizing characteristics of a drilling fluid, called the Shale Stability Index Test is conducted as follows. Stock batches of thick slurries of Glen Rose shale in sea water are prepared by mixing seven parts of dried ground shale into three parts of synthetic sea water (42 gm. synthetic sea salt (ASTM)/liter water). The thick paste is stirred with a heavy duty paddle mixer for 15 minutes and hydrated for at least 16 hours at room temperature. The pasty mixture is then molded into a firm specimen by placing about 260 gm. of the mixture into a standard API high temperature filter press. The filter press is equipped with a special piston and the mixture is subjected to 1000 psi differential pressure at room temperature. Compaction and filtration are maintained for two hours or until about 57 ml. of fluid is removed from the specimen. The cell pressure is then released, the cell opened, and the firm specimen ejected by applying 125 psi nitrogen. These reconstituted shale specimens are placed in stainless steel cups, allowing about ¼ inch protrusion. The specimens are then hydraulically pressed at 1300 psi to insure a tight fit and a stressed state. The excess material above the edge of the cup is removed for moisture determination and the specimen surface is made smooth. Surface hardness is then determined with a standard ASTM grease penetrometer (free fall 3.0 cm.). The cup containing the compacted specimen is fixed to a jar lid and immersed into a pint jar containing the drilling fluid to be tested. The specimen is then exposed to the drilling fluid by hot rolling at 150° F. After 16 hours the jar is cooled and the specimen examined for hardness, swelling, erosion, and moisture content. A shale stability index (SSI) is calculated from the following equation which was derived after considerable experimentation for calculating the relative stabilizing properties of various drilling fluids: $SSI = 100 - 2(Hf - Hi) - 4D$, where $Hi$ = initial penetrometer hardness reading, mm.; $Hf$ = final penetrometer hardness reading, mm. (both Hi and Hf being the deepest of three determinations); and $D$ = amount of swelling or erosion as measured with the penetrometer gauge, mm.

A test devised to indicate the relative bit balling tendency and borehole stabilization characteristics of a drilling fluid is conducted as follows. To 350 ml. of the drilling fluid sample are added from 50 to 100 grams of crude bentonite which has been sized to pass through a 4 mesh screen and retained on an 8 mesh screen. The drilling fluid is then hot rolled at 150° F for 15 lminutes. Thereafter the drilling fluid is poured onto a 30 mesh screen to recover the crude bentonite particles. The particles are then observed to determine the degree of swelling of the particles, the texture of the particles, and the agglomeration tendency of the particles. If the particles exhibit minimum or no swelling, good borehole stabilizing properties of the drilling fluid are indicated. Poor borehole stabilization and possible bit balling tendencies are indicated if the particles exhibit swelling. Softening of the particles indicates poor borehole stabilization characteristics and suggest possible bit balling tendencies. Good borehole stabilization is indicated if the particles remain firm. Strong bit balling tendencies are indicated if the particles are agglomerated.

EXAMPLE 1

Ten drilling fluids containing water, 12 ppb Wyoming bentonite, 25 ppb potassium lignite derivative, 0.25 ppb XC-Polymer (xanthan gum), and the concentrations of KOH, lime and KCl indicated in Table 1 were prepared by hydrating the bentonite and lignite derivative in the water followed by the addition, while mixing, of the other materials. The fluids were mixed for 15 minutes and rolled at 150° F for the number of hours indicated in Table 1. Thereafter the fluids were evaluated for their rheological properties, pH, low temperature filtration, Pf, Pm, $K^+$ concentration, and effect on 4–8 mesh bentonite particles. The data obtained are given in Table 1.

The data indicate that the bentonite particles in the drilling fluids containing KCl and no lime were slightly swollen and considerably softened, and in the case of 10.5 ppb KCl, agglomerated together. The fluids contained 35 and 52.5 ppb KCl had very poor rheological properties. The fluid containing only lime severe swelled and softened the bentonite particles. In contrast to these results, the drilling fluids of the present invention containing KCl and lime had little or no effect on the bentonite particles and good rheological characteristics. This indicates that these fluids have excellent borehole stabilization characteristics and low bit balling tendencies.

Table 1

|  | A | B | C | D | E | F | G | H | I | J |
|---|---|---|---|---|---|---|---|---|---|---|
| Drilling Fluid Composition | | | | | | | | | | |
| KOH, lb./bbl. | 0 | 0 | 0 | 4 | 4 | 4 | 4 | 4 | 4 | 4 |
| Lime, lb./bbl. | 0 | 0 | 0 | 9 | 9 | 9 | 9 | 2 | 4 | 6 |
| KCl, lb./bbl. | 10.5 | 35 | 52.5 | 0 | 10.5 | 35 | 52.5 | 10.5 | 10.5 | 10.5 |
| Treatment | | | | | | | | | | |
| Stirred, min. | 15 | 15 | 15 | 15 | 15 | 15 | 15 | 15 | 15 | 15 |
| Rolled at 150° F, hr. | 1 | 16 | 16 | 1 | 1 | 16 | 16 | 16 | 16 | 16 |
| Properties | | | | | | | | | | |
| Plastic Viscosity, cp. | 19 | * | * | 26 | 28 | 26 | 28 | 20 | 18 | 17 |
| Yield Point ** | 10 | * | * | 14 | 12 | 14 | 10 | 13 | 7 | 6 |
| 10-Sec. Gel. ** | 6 | * | * | 3 | 11 | 4 | 2 | 3 | 2 | 1 |
| 10-Min. Gel. ** | 12 | * | * | 11 | 16 | 17 | 14 | 5 | 4 | 3 |
| pH | 8.9 | * | * | 13.1 | 13.2 | 13.3 | 13.3 | 13.1 | 13.4 | 13.5 |
| API Filtrate, ml. | 6.0 | * | * | 7.5 | 9.0 | 13.0 | 19.7 | 4.9 | 4.8 | 5.8 |
| Pf | 0.1 | * | * | 6.1 | 4.4 | 5.3 | 5.8 | 4.0 | 5.8 | 5.6 |
| Pm | — | * | * | 25 | 24 | 24.0 | 26.5 | 10.0 | 11.5 | 13.0 |
| $K^+$, ppm. | 15,700 | * | * | 4,810 | 12,270 | 32,500 | 50,730 | 12,240 | 13,990 | 12,750 |
| Cuttings Observation | | | | | | | | | | |
| Swelling | Slight | Slight | Slight | Severe | None | None | None | Slight | Slight | None |
| Texture | Soft | Soft | Soft | Soft | Firm | Hard | Hard | Firm | Firm | Firm |
| Agglomeration | Yes | No | No | No | No | No | No | No | No | No |

* Mud excessively thick
** lb./100 sq. ft.

EXAMPLE 2

Five drilling fluids containing water, 8 ppb Wyoming bentonite, 25 ppb potassium lignite derivative, 3 ppb KOH, 10.5 ppb KCl, and the concentrations of lime indicated in Table 2 were prepared by hydrating the bentonite and lignite derivative in the water followed by the addition, while mixing, of the other chemicals in the order indicated. The fluids were mixed for 10 minutes and certain properties obtained as indicated by the data in Table 2. Threafter the fluids were contaminated with 250 ppb Glen Rose shale, mixed for 15 minutes, and certain properties obtained as indicated by the data in Table 2. The fluids were then hot rolled for 16 hours at 150° F, cooled to room temperature and evaluated before and after mixing for 15 minutes. The data obtained are given in Table 2.

Table 2

Effect of Adding Lime to a Base Mud Containing 8ppb. Pre-hydrated Wyoming Bentonite, 25 ppb. Potassium Lignite Derivative, 3ppb. KOH and 10.5 ppb. KCl

|  | A | B | C | D | E |
|---|---|---|---|---|---|
| Drilling Fluid Composition | | | | | |
| Base Mud, bbl | 1.0 | 1.0 | 1.0 | 1.0 | 1.0 |
| Lime, lb. | 0 | 1 | 2 | 4 | 6 |
| Treatment | | | | | |
| Stirred, min. | 10 | 10 | 10 | 10 | 10 |
| Properties | | | | | |
| Plastic Viscosity, cp. | 4 | 4 | 2.5 | 4 | 3.5 |
| Yield Point | 1 | 1 | 1 | 2 | 0.5 |
| 10-Sec. Gel | 0 | 1 | 0 | 1 | 1 |
| 10-Min. Gel | 1 | 1 | 1 | 1 | 1 |
| pH | 11.0 | 12.2 | 12.5 | 12.7 | 12.7 |
| API Filtrate, ml. | 6.8 | 5.6 | 5.0 | 5.0 | 5.2 |
| $P_f$ | 2.1 | 3.2 | 3.5 | 5.0 | 5.9 |
| $M_f$ | 6.2 | 6.8 | 7.1 | 8.1 | 8.5 |
| $P_m$ | 1.3 | 2.1 | 2.8 | 5.2 | 9.0 |
| Treatment | | | | | |
| Glen Rose Shale, lb | 250 | 250 | 250 | 250 | 250 |
| Stirred, min. | 15 | 15 | 15 | 15 | 15 |
| Properties | | | | | |
| Plastic Viscosity, cp. | 16 | 15 | 14 | 22 | 26 |
| Yield Point | 9 | 4 | 1 | 5 | 11 |
| 10-Sec. gel. | 6 | 1 | 1 | 2 | 5 |
| 10-Min. gel. | 22 | 12 | 2 | 3 | 51 |
| pH | 9.8 | 10.7 | 11.3 | 12.3 | 12.6 |
| API Filtrate, ml. | 6.3 | 5.0 | 3.6 | 5.2 | 8.2 |
| $P_f$ | 0.8 | 1.1 | 1.0 | 2.0 | 3.6 |
| $M_f$ | 3.3 | 3.3 | 2.8 | 3.4 | 5.2 |
| $P_m$ | * | * | * | 3.3 | 5.3 |
| Treatment | | | | | |
| Rolled at 159° F hr. | 16 | 16 | 16 | 16 | 16 |
| Properties | | | | | |
| Plastic Viscosity, cp. | 24 | 23 | 18 | 18 | 13.5 |
| Yield Point | 28 | 16 | 5 | 1 | 1 |
| 10-Sec. Gel | 6 | 3 | 1 | 1 | 1 |
| 10-Min. Gel | 25 | 17 | 33 | 2 | 5 |
| Treatment | | | | | |
| Stirred, Min. | 15 | 15 | 15 | 15 | 15 |
| Properties | | | | | |
| Plastic Viscosity, cp. | 15 | 14 | 13 | 15 | 12 |
| Yield Point | 29 | 21 | 7 | 1 | 0 |
| 10-Sec. Gel | 20 | 15 | 4 | 1 | 1 |
| 10-Min. Gel | 35 | 31 | 17 | 2 | 1 |
| pH | 9.1 | 9.7 | 10.3 | 11.6 | 12.2 |
| API Filtrate, ml. | 5.2 | 5.0 | 3.9 | 3.4 | 5.2 |
| $P_f$ | 0 | 0.3 | 0.4 | 1.3 | 2.3 |
| $M_f$ | 2.8 | 2.7 | 3.0 | 3.4 | 4.2 |
| $P_m$ | * | * | * | 1.2 | 4.7 |
| $K^+$, ppm | 16,800 | 16,500 | 18,200 | 17,400 | 16,000 |
| $Ca^{++}$, ppm | 0 | 0 | 0 | 40 | 120 |

\* End point obscure - very low value

The data indicate that the drilling fluids of this invention, compositions D and E, possessed good rheological and filtration characteristics before and after contamination with the shale. Thermal gelation, mud thickening under low shear conditions at elevated temperature, occurred in muds A, b, and C after hot rolling at 150° F. However, muds D and E. which contained sufficient lime to produce the muds of this invention, showed no thermal gelation under the same conditions. The data also indicate the ease of control of the drilling fluids of this invention since the excellent rheological, filtration, and shale stabilization characteristics were retained even though the pH, Pf, and Pm values varied over a wide range.

EXAMPLE 3

Twenty drilling fluid samples having compositions listed in Table 3 were prepared by mixing, for a total of 25 minutes, the materials in the order listed. The pH and rheological properties of these fluids were evaluated. Thereafter the drilling fluids were rolled in an oven at 150° F for 16 hours and various properties determined before and after mixing. The data obtained are given in Table 3. The data indicate that all of these drilling fluids possessed excellent rheological characteristics. However the fluid designated N, which is not an example of this invention, had an adverse effect on bentonite particles incorporated into it.

EXAMPLE 4

Nine drilling fluids containing water, 8 ppb Wyoming bentonite, 25 ppb potassium lignite derivative, and the concentrations of KCl, KOH, and lime indicated in Table 4 were prepared by hydrating the bentonite and lignite followed by the addition, while mixing, of the other materials in the order indicated in Table 4. The fluids were mixed for 15 minutes and certain properties obtained before and after hot rolling at 150° F for 2 hours. The fluids were contaminated with 250 ppb Glen Rose shale and certain properties obtained as indicated in Table 4. The fluids were then hot rolled at 150° F for 16 hours, cooled to room temperature and evaluated before and after mixing for 15 minutes. The data obtained are given in Table 4.

Table 3

| Drilling Fluid Composition | A | B | C | D | E | F | G | H |
|---|---|---|---|---|---|---|---|---|
| Water, bbl. | 1.0 | 1.0 | 1.0 | 1.0 | 1.0 | 1.0 | 1.0 | 1.0 |
| Wyoming Bentonite, lb. | 8 | 8 | 8 | 8 | 8 | 8 | 8 | 8 |
| Potassium Lignite, lb. | 25 | 25 | 25 | 25 | 25 | 25 | 25 | 10 |
| KOH, lb. | 1 | 2 | 3 | 4 | 3 | 3 | 3 | 3 |
| KCl, lb. | 10.5 | 10.5 | 10.5 | 10.5 | 3.5 | 7 | 14 | 10.5 |
| (pH) | 9.7 | 10.7 | 11.7 | 12.1 | 11.6 | 11.7 | 11.7 | 12.5 |
| Lime, lb. | 6 | 6 | 6 | 6 | 6 | 6 | 6 | 6 |
| Treatment | | | | | | | | |
| Stirred, min. (total) | 25 | 25 | 25 | 25 | 25 | 25 | 25 | 25 |
| Properties | | | | | | | | |
| Plastic Viscosity, cp. | 15 | 9 | 4 | 3 | 3 | 4.5 | 16 | 6 |
| Yield Point, lb./100 sq. ft. | 9 | 6 | 1 | 3 | 0 | 3 | 5 | 6 |
| 10-Sec. Gel., lb./100 sq. ft. | 2 1 | 0 | 1 | 1 | 2 | 1 | 2 | |
| 10-Min. Gel., lb/100 sq. ft. | 16 | 7 | 1 | 3 | 1 | 2 | 13 | 7 |
| pH | 12.4 | 12.5 | 12.5 | 12.7 | 12.7 | 12.6 | 12.7 | 12.7 |
| Treatment | | | | | | | | |
| Rolled at 150° F, hr. | 16 | 16 | 16 | 16 | 16 | 16 | 16 | 16 |
| Properties | | | | | | | | |
| Plastic Viscosity, cp. | 6 | 4 | 4 | 4 | 3 | 4 | 5 | 6 |
| Yield Point, lb./100 sq. ft. | 1 | 1 | 0 | 0 | 0.5 | 1 | 1 | 1 |
| 10-Sec. Gel., lb./100 sq. ft. | 1 | 1 | 0.5 | 1 | 0.5 | 1 | 1 | 1 |
| 10-Min. Gel., lb./100 sq. ft. | 2 | 1 | 1 | 1.5 | 1 | 1 | 1.5 | 1.5 |
| Treatment | | | | | | | | |
| Stirred, min. | 10 | 10 | 10 | 10 | 10 | 10 | 10 | 10 |
| Properties | | | | | | | | |
| Plastic Viscosity, cp. | 3.5 | 4 | 3.5 | 3 | 3 | 3 | 4 | 3 |
| Yield Point, lb./100 sq. ft. | 1 | 0 | 0 | 1 | 0 | 1 | 0 | 0 |
| 10-Sec. Gel., lb./100 sq. ft. | 1 | 0.5 | 1 | 1 | 1 | 1 | 1 | 1 |
| 10-Min. Gel., lb./100 sq. ft. | 1 | 1 | 1 | 1 | 1 | 1 | 1 | 1 |
| pH | 12.7 | 12.9 | 13.1 | 13.1 | 13.0 | 13.1 | 13.0 | 12.8 |
| API Filtrate, ml. | 10.8 | 9.2 | 6.2 | 6.4 | 5.3 | 7.2 | 7.0 | 26.6 |
| Pf | 3.4 | 5.0 | 5.8 | 7.8 | 7.2 | 6.7 | 6.8 | 6.4 |
| Mf | 5.7 | 7.4 | 9.0 | 10.7 | 10.2 | 9.5 | 9.0 | 7.7 |
| Pm | 6.5 | 8.8 | 9.2 | 11.0 | 10.2 | 10.0 | 13.4 | 13.0 |
| $K^+$, ppm × $10^{+3}$ | 16.2 | 16.3 | 17.7 | 19.5 | 12.0 | 13.6 | 21.7 | 14.3 |
| $Ca^{++}$, ppm. | 160 | 120 | 160 | 120 | 160 | 120 | 160 | 180 |
| Cuttings Observation | | | | | | | | |
| Swelling * | 1 | 1 | 1 | 1 | 1 | 1 | 1 | 1.5 |
| Texture ** | 1 | 1 | 1 | 1 | 1 | 1 | 1 | 1 |
| Agglomeration *** | 1.5 | 1 | 1 | 0.5 | 1 | 1 | 1 | 1 |

| Drilling Fluid Composition | I | J | K | L | M | N |
|---|---|---|---|---|---|---|
| Water, bbl. | 1.0 | 1.0 | 1.0 | 1.0 | 1.0 | 1.0 |
| Wyoming Bentonite, lb. | 8 | 8 | 8 | 15 | 5 | 8 |
| Potassium Lignite, lb. | 15 | 20 | 30 | 30 | 30 | 25 |
| KOH, lb. | 3 | 3 | 3 | 3 | 4 | 0 |
| KCl, lb. | 10.5 | 10.5 | 10.5 | 10.5 | 10.5 | 10.5 |
| (pH) | 12.4 | 12.0 | 11.1 | 10.8 | 12.0 | 8.5 |
| Lime, lb | 6 | 6 | 6 | 6 | 12 | 3 |
| Treatment | | | | | | |
| Stirred, min. (total) | 25 | 25 | 25 | 25 | 25 | 25 |
| Properties | | | | | | |
| Plastic Viscosity, cp. | 10 | 13 | 6 | 15 | 8.5 | 3.5 |
| Yield Point, lb./100 sq.ft. | | 9 | 2 | 16 | 5 | 5 |
| 10-Sec.Gel., lb./100 sq.ft. | 1 | 2 | 1 | 3 | 1 | 2 |
| 10-Min.Gel., lb./100 sq.ft. | 9 | 13 | 1 | 35 | 10 | 3 |
| pH | 12.6 | 12.6 | 12.7 | 12.7 | 12.6 | 11.4 |
| Treatment | | | | | | |
| Rolled at 150° F, hr. | 16 | 16 | 16 | 16 | 16 | 16 |
| Properties | | | | | | |
| Plastic Viscosity, cp. | 7.5 | 7 | 4 | 12 | 6 | 10 |
| Yield Point, lb./100 sq.ft. | 2 | 2 | 2 | 3 | 2 | 2 |
| 10-Sec.Gel., lb./100 sq.ft. | 1 | 1 | 1 | 2 | 1 | 2 |
| 10-Min.Gel., lb./100 sq.ft. | 1 | 2 | 2 | 4 | 1 | 3 |
| Treatment | | | | | | |
| Stirred, min. | 10 | 10 | 10 | 10 | 10 | 10 |
| Properties | | | | | | |
| Plastic Viscosity, cp. | 3 | 3.5 | 4.5 | 8 | 5 | 4.5 |
| Yield Point, lb./100 sq.ft. | 0.5 | 1 | 0 | 1.5 | 0 | 1 |
| 10-Sec.Gel., lb./100 sq.ft. | 0.5 | 1 | 0.5 | 1 | 0.5 | 1.5 |
| 10-Min.Gel., lb./100 sq.ft. | 1 | 1 | 1 | 1 | 1 | 2 |
| pH | 13.0 | 13.2 | 12.9 | 13.0 | 13.2 | 10.9 |
| API Filtrate, ml. | 18.0 | 12.6 | 5.4 | 6.6 | 9.6 | 8.0 |
| Pf | 6.7 | 6.9 | 6.7 | 6.3 | 9.9 | 0.2 |
| Mf | 8.7 | 8.9 | 9.7 | 8.5 | 12.5 | 1.6 |
| Pm | 17.4 | 16.8 | 12.8 | 14.0 | 29.6 | 2.2 |
| $K^+$, ppm × $10^{+3}$ | 15.6 | 16.3 | 17.8 | 17.0 | 19.5 | 14.2 |
| $Ca^{++}$, ppm. | 180 | 200 | 180 | 160 | 240 | 120 |
| Cuttings Observation | | | | | | |
| Swelling * | 1.5 | 1 | 1 | 1 | 1 | 3 |
| Texture ** | 1 | 1 | 1 | 1 | 1 | 3 |
| Agglomeration *** | 1 | 1 | 1 | 2 | 1.5 | 3 |

| Drilling Fluid Composition | O | P | Q | R | S | T |
|---|---|---|---|---|---|---|
| Water, bbl. | 1.0 | 1.0 | 1.0 | 1.0 | 1.0 | 1.0 |
| Wyoming Bentonite, lb. | 8 | 8 | 8 | 8 | 8 | 8 |
| Potassium Lignite, lb. | 25 | 25 | 25 | 25 | 25 | 25 |
| KOH, lb. | 1 | 2 | 3 | 3 | 3 | 3 |
| KCl, lb. | 10.5 | 10.5 | 10.5 | 3.5 | 7 | 14 |
| (pH) | 9.4 | 10.5 | 11.6 | 11.6 | 11.5 | 11.6 |

Table 3-continued

| | | | | | | |
|---|---|---|---|---|---|---|
| Lime, lb. | 3 | 3 | 3 | 3 | 3 | 3 |
| Treatment | | | | | | |
| Stirred, min. (total) | 25 | 25 | 25 | 25 | 25 | 25 |
| Properties | | | | | | |
| Plastic Viscosity, cp. | 3.5 | 3 | 3 | 2.5 | 2.5 | 4 |
| Yield Point, lb./100 sq.ft. | 0.5 | 5 | 0.5 | 3.5 | 0.5 | 5 |
| 10-Sec.Gel., lb./100 sq.ft. | 0 | 2 | 0.5 | 2 | 1 | 2 |
| 10-Min.Gel., lb./100 sq.ft. | 1 | 2 | 1 | 2 | 1 | 2 |
| pH | 11.9 | 12.4 | 12.6 | 12.6 | 12.5 | 12.5 |
| Treatment | | | | | | |
| Rolled at 150° F, hr. | 16 | 16 | 16 | 16 | 16 | 16 |
| Properties | | | | | | |
| Plastic Viscosity, cp. | 4 | 3 | 3 | 2.5 | 1.5 | 3.5 |
| Yield Point, lb./100 sq.ft. | 0 | 1 | 0.5 | 1 | 1.5 | 1 |
| 10-Sec.Gel., lb./100 sq.ft. | 0.5 | 1 | 0.5 | 1 | 1 | 1 |
| 10-Min.Gel., lb./100 sq.ft. | 1 | 2 | 1 | 1.5 | 1 | 1.5 |
| Treatment | | | | | | |
| Stirred, min. | 10 | 10 | 10 | 10 | 10 | 10 |
| Properties | | | | | | |
| Plastic Viscosity, cp. | 2.5 | 3 | 2.5 | 3.5 | 2.5 | 3 |
| Yield Point, lb./100 sq.ft. | 0 | 1 | 1.5 | 0.5 | 0 | 1 |
| 10-Sec.Gel., lb./100 sq.ft. | 0.5 | 1 | 0.5 | 1 | 0.5 | 1 |
| 10-Min.Gel., lb./100 sq.ft. | 0.5 | 1 | 1 | 2 | 1 | 1 |
| pH | 12.0 | 12.6 | 12.8 | 12.4 | 12.6 | 12.7 |
| API Filtrate, ml. | 6.6 | 7.0 | 6.8 | 6.6 | 6.6 | 5.8 |
| Pf | 1.4 | 3.1 | 4.9 | 5.9 | 5.2 | 5.1 |
| Mf | 3.5 | 5.6 | 7.6 | 8.6 | 8.3 | 8.0 |
| Pm | 3.8 | 5.4 | 8.0 | 7.6 | 28 | 8.2 |
| $K^+$, ppm $\times 10^{+3}$ | 14.9 | 15.6 | 16.3 | 11.0 | 14.9 | 17.1 |
| $Ca^{++}$, ppm | 80 | 120 | 140 | 100 | 140 | 200 |
| Cuttings Observation | | | | | | |
| Swelling * | 2 | 1.5 | 1 | 1 | 1 | 1 |
| Texture ** | 1.5 | 1 | 1 | 1 | 1 | 1 |
| Agglomeration *** | 2 | 1.5 | 1 | 1 | 1 | 1 |

\* 0 = No change; 1 = Slight; 2 = Medium; 3 = High
\*\* 0 = No change; 1 = Firm; 2 =Soft; 3 = Very soft (mushy)
\*\*\* 0 = No sticking; 1 = Slight; 2 = Medium; 3 = High The data indicate the excellent rheological and shale stabilization characteristics of the drilling fluids of this invention, compositions H and I, as compared to these characteristics of the drilling fluids which are not a part of this invention. The data also indicate the preferred method of preparing fresh drilling fluids containing clay, a lignite derivative, KOH, KCl and lime. Thus the data indicate that the minimum increase in viscosity and gel strengths occurs on addition of the KOH, KCl, and lime, in that order, to the slurry containing clay and the lignitic material.

EXAMPLE 5

Three drilling fluids containing the concentrations of materials indicated in Table 5 were prepared, evaluated for $K^+$ concentration, placed in a high temperature, high pressure aging cell, and aged at 400° F and 500 psi for 16 hours. After cooling to room temperature and relieving the pressure the fluids were evaluated for certain properties as listed in Table 5. The data shows the better suspension characteristics of the drilling fluids of this invention, composition C, as compared to lime containing drilling fluids containing no KCl.

Table 4

Effect of Adding KOH, KCl, and Lime to a Base Mud Containing 8 ppb. Pre-hydrated Wyoming Bentonite and 25 ppb. Potassium Lignite Derivative

| | A | B | C | D | E | F | G | H | I |
|---|---|---|---|---|---|---|---|---|---|
| Drilling Fluid Composition | | | | | | | | | |
| Base Mud, bbl. | 1.0 | 1.0 | 1.0 | 1.0 | 1.0 | 1.0 | 1.0 | 1.0 | 1.0 |
| KCl, lb. | | 10.5 | | 10.5 | | 10.5 | | 10.5 | |
| KOH, lb. | | | 3.0 | 3.0 | | | 3.0 | 3.0 | 3.0 |
| Lime, lb. | | | | | 6.0 | 6.0 | 6.0 | 6.0 | 6.0 |
| KCl, lb. | | | | | | | | | 10.5 |
| Treatment | | | | | | | | | |
| Stirred, min. | 15 | 15 | 15 | 15 | 15 | 15 | 15 | 15 | 15 |
| Properties | | | | | | | | | |
| Plastic Viscosity, cp. | 3 | 7 | 2 | 2.5 | 11 | 8 | 13 | 8 | 11 |
| Yield Point, lb/100 sq ft. | 1 | 4 | 1 | 2 | 6 | 3 | 6 | 4 | 5 |
| 10-Sec.Gel, lb/100 sq ft. | 2 | 4 | 1 | 1 | 11 | 11 | 17 | 1 | 6 |
| 10-Min.Gel, lb/100 sq ft. | 2 | 15 | 1 | 1 | 72 | 31 | 92 | 22 | 35 |
| pH | 8.9 | 8.7 | 11.9 | 11.7 | 12.6 | 12.5 | 12.6 | 12.7 | 12.8 |
| Treatment | | | | | | | | | |
| Rolled at 150° F, hr. | 2 | 2 | 2 | 2 | 2 | 2 | 2 | 2 | 2 |
| Properties | | | | | | | | | |
| Plastic Viscosity, cp. | 2.5 | 4 | 1 | 4 | 2.5 | 8 | 9 | 2 | 3 |
| Yield Point, lb/100 sq ft. | 1.5 | 7 | 1 | 8 | 7.5 | 6 | 4 | 1 | 1 |
| 10-Sec.Gel, lb/100 sq ft. | 1 | 6 | 1 | 4 | 2 | 7 | 2 | 1 | 1 |
| 10-Min.Gel, lb/100 sq ft. | 2 | 13 | 1 | 6 | 8 | 15 | 12 | 2 | 1 |
| pH | | 8.7 | | 11.3 | | 12.3 | | 12.7 | |
| Treatment | | | | | | | | | |
| Glen Rose Shale, lb. | 250 | 250 | 250 | 250 | 250 | 250 | 250 | 250 | 250 |
| Stirred, Min. | 15 | 15 | 15 | 15 | 15 | 15 | 15 | 15 | 15 |
| Properties | | | | | | | | | |
| Plastic Viscosity, cp. | 15 | 8 | 13 | 13 | 18 | 15 | 15 | 15 | 18 |

Table 4-continued

Effect of Adding KOH, KCl, and Lime to a Base Mud Containing 8 ppb. Pre-hydrated Wyoming Bentonite and 25 ppb. Potassium Lignite Derivative

|  | A | B | C | D | E | F | G | H | I |
|---|---|---|---|---|---|---|---|---|---|
| Yield Point | 15 | 76 | 8 | 16 | 21 | 90 | 51 | 9 | 14 |
| 10-Sec. Gel | 8 | 30 | 5 | 12 | 65 | 68 | 48 | 22 | 30 |
| 10-Min. Gel | 34 | 47 | 18 | 27 | 75 | 87 | 91 | 76 | 115 |
| pH | 8.6 | 8.1 | 10.4 | 10.0 | 12.3 | 12.0 | 12.3 | 12.4 | 12.5 |
| API Filtrate, ml. | 3.8 | 18.8 | 7.0 | 8.4 | 12.6 | 29.8 | 10.8 | 12.8 | 13.4 |
| $P_f$ | 0.1 | 0 | 1.0 | 0.3 | 2.4 | 1.7 | 2.3 | 4.2 | 4.0 |
| $M_f$ | 4.4 | 1.7 | 6.2 | 4.3 | 4.5 | 3.8 | 3.8 | 6.0 | 6.0 |
| Treatment |  |  |  |  |  |  |  |  |  |
| Rolled at 150° F, hr. | 16 | 16 | 16 | 16 | 16 | 16 | 16 | 16 | 16 |
| Properties |  |  |  |  |  |  |  |  |  |
| Plastic Viscosity, cp. | 22 | 5 | 16 | 13 | 15 | 16 | 25 | 13 | 19 |
| Yield Point | 22 | 89 | 21 | 7 | 0 | 27 | 0 | 0 | 0 |
| 10-Sec. Gel | 5 | 30 | 6 | 2 | 3 | 28 | 4 | 1 | 1 |
| 10-Min. Gel | 30 | 50 | 22 | 11 | 20 | 31 | 27 | 5 | 6 |
| Treatment |  |  |  |  |  |  |  |  |  |
| Stirred, Min. | 15 | 15 | 15 | 15 | 15 | 15 | 15 | 15 | 15 |
| Properties |  |  |  |  |  |  |  |  |  |
| Plastic Viscosity, cp. | 17 | 5 | 12 | 10 | 14 | 21 | 17 | 16 | 15 |
| Yield Point | 19 | 137 | 21 | 15 | 8 | 66 | 9 | 0 | 3 |
| 10-Sec. Gel | 13 | 40 | 10 | 6 | 9 | 40 | 22 | 2 | 2 |
| 10-Min. Gel | 38 | 55 | 25 | 21 | 52 | 55 | 74 | 15 | 18 |
| pH | 8.6 | 8.1 | 9.7 | 9.7 | 12.1 | 12.0 | 12.0 | 12.5 | 12.4 |
| API Filtrate, ml. | 4.2 | 19.0 | 14.0 | 5.2 | 10.6 | 23.6 | 10.8 | 12.4 | 11.4 |
| $P_f$ | 0 | 0 | 0.1 | 0.1 | 1.4 | 1.1 | 1.2 | 3.8 | 3.1 |
| $M_f$ | 1.9 | 1.6 | 5.1 | 3.4 | 2.7 | 2.1 | 2.4 | 5.7 | — |
| $K^+$, ppm | 3380 | 14,390 | 4085 | 14,550 | 2575 | 13,525 | 2525 | 16,170 | 13,470 |

Table 5

Effect of $K^+$ Concentration on the Stability of $K^+$-Lime Muds to Aging at 500 psi, 400° F for 16 Hours

|  | A | B | C |
|---|---|---|---|
| Drilling Fluid Composition |  |  |  |
| Water, bbl. |  |  |  |
| Wyoming bentonite, lb. | 5 | 15 | 5 |
| Glen Rose Shale, lb. | 60 | 50 | 60 |
| Potassium Lignite, lb. | 25 | 25 | 25 |
| Lime, lb. | 8 | 8 | 8 |
| KOH, lb. | 1.5 | 1.5 | 1.5 |
| KCl, lb. | 0 | 0 | 14 |
| Diesel Oil, bbl. | 0.05 | 0.05 | 0.05 |
| Barite, lb. | 550 | 550 | 550 |
| $K^+$, ppm | 4000 | 3800 | 18000 |
| Top Separation, in. | 0 | 1.5 | 0.6 |
| Shear Strength, lb./100 sq. ft. | 10 | 20 | 20 |
| Settling of Barite | Severe | Moderate | None |
| Plastic Viscosity, cp. | 15 | 43 | 25 |
| Yield Point, lb./100 sq. ft. | 0 | 3 | 0 |
| 10-Sec. Gel., lb./100 sq. ft. | 1 | 1 | 1 |
| 10-Min. Gel., lb./100 sq. ft. | 1 | 4 | 1 |

EXAMPLE 6

A fresh water Wyoming bentonite (AQUAGEL) slurry was used to drill a well in South Texas to the top of the Anahuac pressured, mud-making, sloughing shale formation at 7501 feet where 7⅝ inches casing was set with a 12.0 ppg ferrochrome lignosulfonate (Q-BROXIN) treated mud. This mud was displaced with 510 barrels of premixed mud and 200 barrels of mud converted on location. Each barrel of pre-mixed mud contained 0.85 bbl. water, 5 lb. Wyoming bentonite, 0.3 lb. XC - Polymer, 20 lb. potassium lignite derivative (K - LIG, trademark, Baroid Division, N L Industries, Inc.), 3 lb. KOH, 7 lb. lime, 17.5 lb. KCl, and barite (BAROID) for a density of 12.0 ppg. The drill pipe and annulus were displaced by the pre-mixed mud from the vacuum tank trucks piped directly to the rig pumps. Two hundred barrels of the lignosulfonate mud were picked up from the rig tanks and held while the remainder of the fluid was removed to the storage pit. The three rig tanks were then cleaned and the remainder of the pre-mixed mud pumped off the trucks. The lignosulfonate treated mud was then pumped back into two of the rig tanks and watered-back to an equivalent of 12–15 ppb of reactive clay. The following were added to the diluted mud simultaneously: 3.5 ppb KOH, 18 ppb. potassium lignite derivative, and 4 ppb lime. When the viscosity had stabilized the following were added: 4 ppb lime, 17.5 ppb KCl, and barite for a density of 12.0 ppg. The two converted tanks were then circulated with the third isolated tank that contained premixed mud. As the three tanks were circulated the remainder of the pre-mixed mud from the vacuum trucks was added to the system. Drilling operations commenced shortly after. Solids control equipment on the rig included a Baroid Double Deck Shaker (30 mesh over 80 mesh screens), a Baroid Mud Centrifuge, and a cone-type desilter.

This well was drilled to a total depth of 11,793 feet. The potassium-lime drilling fluid ranging in density from 12.0 ppg to 16.5 ppg gave adequate shale stability to drill over 2,500 feet of Anahuac shale. Bit balling and sloughing were never major problems. Shale cuttings were generally firm and handled easily by fine mesh shaker screens despite the high mud making characteristics of the Anahuac shale formation. Rheological properties of the fluid were very stable throughout the operation. Density was easily controlled at all times. The data obtained from analyses of the drilling fluid at various depths is given in Table 6. The drilling fluid was maintained by the periodic addition of AQUAGEL bentonite, XC Polymer, BAROID barite, K-LIG potassium lignite derivative, CARBONOX lignite, Q-BROXIN ferrochrome lignosulfonate, KOH, KCl, and lime.

Table 6

| Depth of Well, ft. | 7,819 | 8,763 | 9,651 | 10,315 | 10,882 | 11,165 | 11,793 |
|---|---|---|---|---|---|---|---|
| MUD PROPERTIES |  |  |  |  |  |  |  |

Table 6-continued

| Depth of Well, ft. | 7,819 | 8,763 | 9,651 | 10,315 | 10,882 | 11,165 | 11,793 |
|---|---|---|---|---|---|---|---|
| Temperature FL, °F | 80 | 130 | 135 | 130 | 124 | 123 | 135 |
| Density, ppg. | 14.0 | 15.5 | 15.9 | 16.3 | 16.4 | 16.4 | 17.3 |
| Funnel Viscosity, Sec. | 45 | 60 | 47 | 44 | 45 | 44 | 45 |
| Plastic Viscosity, cp. | 22 | 24 | 26 | 34 | 29 | 29 | 31 |
| Yield Point, lb/100 sq. ft. | 17 | 26 | 20 | 22 | 21 | 19 | 27 |
| 10-Sec. Gel, lb/100 sq. ft. | 12 | 23 | 6 | 5 | 8 | 8 | 12 |
| 10-Min. Gel, lb/100 sq. ft. | 18 | 41 | 36 | 21 | 25 | 34 | 45 |
| pH | 13.1 | 12.8 | 12.7 | 12.8 | 13 | 12.8 | 12.5 |
| API Filtrate, ml. | 11.2 | 7.6 | 7.9 | 7.2 | 6.4 | 7.2 | 6.6 |
| Filtrate, 250° F, 500 psi, ml. | 32.8 | 21.2 | 31.2 | 23.4 | 28 | 34.4 | 28.8 |
| Resistivity of Mud, ohm-M | | | .25/72° | .26/70° | .3/62° | .29/70° | .30/82° |
| Resistivity of Filtrate,ohm-M | | | .1/78° | .11/74° | .12/68° | .13/70° | .13/84° |
| MUD COMPOSITION | | | | | | | |
| Water, % by Volume | 68 | 63 | 68 | 66 | 64 | 66 | 63 |
| Oil, % by Volume | 5 | 5 | 3 | 2 | 3 | 2 | 2 |
| Salt, % by Volume | 1.4 | 1.3 | .7 | .6 | .6 | .6 | .6 |
| Undissolved Solids, % by Vol. | 25.6 | 30.7 | 28.3 | 31.4 | 32.4 | 31.4 | 34.4 |
| Avg. Sp. Gr. Undissolved Solids | — | — | 4.11 | 4.08 | 4.02 | 4.11 | 4.16 |
| Methylene Blue, ml/g. | 3 | 5 | 4.5 | 5.5 | 5.5 | 5 | 4.5 |
| Chloride Ion, ppm × 1000 | 32 | 25.5 | 20 | 16 | 15 | 14 | 14 |
| Pf | 5.2 | 4.5 | 5.7 | 8.2 | 8.1 | 6.2 | 5.4 |
| Pm | 24 | 20.5 | 22 | 26.5 | 25.5 | 20 | 18 |
| Potassium Ion, ppm × 1000 | 26.6 | 15.6 | 11.3 | 16.7 | 14.7 | 12.6 | 11.3 |
| Sodium Ion, ppm × 1000 | 2.48 | 4.59 | 3.85 | 3.68 | 3.5 | 3.68 | 6.24 |

EXAMPLE 7

Four drilling fluids containing water, 8 ppb Wyoming bentonite, 25 ppb potassium lignite, 3 ppb KOH, 16 ppb lime, and the concentration of KCl indicated in Table 7 were prepared by hydrating the bentonite and potassium lignite in the water followed by the addition of the KOH, KCl, and lime in that order. These fluids were mixed for a total of 25 minutes and rolled in an oven at 150° F for 16 hours. Thereafter the fluids were cooled to room temperature, evaluated for their rheological properties, stirred for 10 minutes, and evaluated for various properties as indicated in Table 7.

The data obtained, given in Table 7, indicate that the drilling fluid should contain at least 8000 ppm K+ in order for the drilling fluid to have the excellent borehole stabilization and low bit balling characteristics desired, preferably at least 10,000 ppm.

TABLE 7

| | A | B | C | D |
|---|---|---|---|---|
| Drilling Fluid Composition | | | | |
| Water, bbl. | 1.0 | 1.0 | 1.0 | 1.0 |
| Wyoming bentonite, lb. | 8 | 8 | 8 | 8 |
| Potassium Lignite, lb. | 25 | 25 | 25 | 25 |
| KOH, lb. | 3 | 3 | 3 | 3 |
| KCl, lb. | 0 | 1 | 2 | 3 |
| Lime, lb | 6 | 6 | 6 | 6 |
| Treatment | | | | |
| Stirred, min. | 25 | 25 | 25 | 25 |
| Rolled at 150° F, hr. | 16 | 16 | 16 | 16 |
| Properties | | | | |
| Plastic Viscosity, cp. | 2.5 | 4 | 3.5 | 4 |
| Yield Point, lb./100 sq.ft. | 1 | 0 | 1 | 1 |
| 10-Sec.Gel., lb./100 sq.ft. | 1 | 1 | 1 | 1 |
| 10-Min.Gel., lb./100 sq.ft. | 1.5 | 1 | 2 | 2 |
| Treatment | | | | |
| Stirred, min. | 10 | 10 | 10 | 10 |
| Properties | | | | |
| Plastic Viscosity, cp. | 3.0 | 3.5 | 3.5 | 3.5 |
| Yield Point, lb./100 sq.ft. | 0.5 | 1 | 0.5 | 1.5 |
| 10-Sec.Gel., lb./100 sq.ft. | 1 | 1 | 1 | 1 |
| 10-Min.Gel., lb./100 sq.ft. | 1.5 | 1 | 1 | 1 |
| pH | 12.9 | 12.9 | 12.9 | 12.9 |
| API Filtrate, ml. | 7.4 | 7.6 | 7.2 | 8.0 |
| Pf | 5.9 | 5.9 | 5.9 | 6.0 |
| Mf | 8.7 | 8.6 | 8.6 | 8.8 |
| Pm | 15.0 | 15.3 | 14.9 | 14.8 |
| K+, ppm | 7440 | 8880 | 10,000 | 10,600 |
| Ca++, ppm | 160 | 160 | 160 | 160 |
| Cuttings Observation | | | | |
| Swelling * | 2 | 1.5 | 1 | 1 |
| Texture ** | 2 | 1.5 | 1 | 1 |
| Agglomeraton *** | 2 | 1.5 | 1 | 1 |

\* 0 = No change; 1 = Slight; 2 = Medium; 3 = High
\*\* 0 = No change; 1 = Firm; 2 = Soft; 3 = Very soft (mushy)
\*\*\* 0 = No sticking; 1 = Slight; 2 = Medium; 3 = High

I claim:

1. A drilling fluid consisting essentially of a suspension of clay, lime, and a lignitic material in an aqueous phase, said drilling fluid having a Pm in the range from 1 to 40 and a pH in the range from 12.4 to 13.5, said aqueous phase being saturated with lime and having a Pf in the range from 1 to 8, and a K+ concentration of at least 8000 ppm., wherein Pm>Pf, and wherein said lignitic material is present in a concentration within the range from 10 to 35 ppb., and wherein said K+ is obtained from said lignitic material, potassium hydroxide, and potassium chloride.

2. The drilling fluid of claim 1 wherein said lignitic material contains potassium humate.

3. The drilling fluid of claim 1 having a K$^+$ concentration of at least 10000 ppm.

4. The drilling fluid of claim 3 wherein said lignitic material contains potassium humate.

5. The drilling fluid of claim 1 wherein said Pm is in the range from 2 to 30 and wherein said Pf is in the range from 2 to 8.

6. The drilling fluid of claim 5 wherein said lignitic material contains potassiun humate.

7. The drilling fluid of claim 5 having a K$^+$ concentration of at least 10000 ppm.

8. The drilling fluid of claim 7 wherein said lignitic material contains potassium humate.

9. The method of producing an aqueous drilling fluid comprising a suspension of clay, lime, and a lignitic material in an aqueous phase, said drilling fluid having a pH in the range from 12.4 to 13.5 and a Pm in the range from 1 to 40, said aqueous phase being saturated with lime having a Pf in the range from 1 to 8, a Ca$^{++}$ concentration less than 200 ppm., and a K$^+$ concentration of at least 8000 ppm., wherein Pm>Pf, which comprises:

adding to an aqueous suspension of said clay and said lignitic material in the order indicated:
   i. potassium hydroxide;
   ii. potassium chloride;
   iii. lime;

wherein the amount of said potassium hydroxide, said potassium chloride, and said lime is sufficient to impart to said drilling fluid said Pm, said pH, said Pf, and said K$^+$ concentration.

10. The method of claim 9 wherein said lignitic material contains potassium humate.

11. The method of claim 9 wherein said aqueous phase contains at least 10000 ppm. K$^+$.

12. The method of claim 11 wherein said lignitic material contains potassium humate.

13. The method of claim 9 wherein said Pm is in the range from 2 to 30 and wherein said Pf is in the range from 2 to 8.

14. The method of claim 13 wherein said lignitic material contains potassium humate.

15. The method of claim 13 wherein said aqueous phase contains at least 10000 ppm. K$^+$.

16. The method of claim 15 wherein said lignitic material contains potassium humate.

* * * * *